US011046381B1

(12) United States Patent
Gu (10) Patent No.: US 11,046,381 B1
(45) Date of Patent: Jun. 29, 2021

(54) WALL MOUNTED BICYCLE RACK

(71) Applicant: Haidong Gu, Pomona, CA (US)

(72) Inventor: Haidong Gu, Pomona, CA (US)

(73) Assignee: CYCLINGDEAL USA, INC., Pomona, CA (US)

( * ) Notice: Subject to any disclaimer, the term of this patent is extended or adjusted under 35 U.S.C. 154(b) by 0 days.

(21) Appl. No.: 17/006,898

(22) Filed: Aug. 31, 2020

(51) Int. Cl.
*B62H 3/12* (2006.01)

(52) U.S. Cl.
CPC ..................... *B62H 3/12* (2013.01)

(58) Field of Classification Search
CPC .... B62H 3/12; B62H 3/04; B62H 3/00; A47B 96/067; A47B 96/061; B25H 3/04; A47F 5/0838; A47F 5/0846; A47F 5/0853; A47F 7/0028; A47G 25/746; A47G 25/0678
USPC .... 211/18, 19, 113, 94.01, 87.01, 100, 70.6, 211/106.01, 85.3, 85.7, 17, 107, 66, 211/105.1, 20, 86.01; 248/223.31, 248/223.41, 225.11, 214, 298.1, 339, 248/222.14
See application file for complete search history.

(56) References Cited

U.S. PATENT DOCUMENTS

| | | | | |
|---|---|---|---|---|
| 3,515,284 A * | 6/1970 | Taylor | ................... | B25H 3/04 211/60.1 |
| 4,218,028 A * | 8/1980 | Pickens | ................. | A47K 10/38 242/129.51 |
| 4,352,478 A * | 10/1982 | Loew | ................... | A47F 5/0853 248/220.31 |
| 4,467,925 A * | 8/1984 | Ratzloff | ................... | B25H 3/04 211/103 |
| 4,771,897 A * | 9/1988 | Ho | ....................... | A47G 29/10 211/85.9 |
| 4,880,192 A * | 11/1989 | Vom Braucke | ....... | A47L 13/512 248/110 |
| 5,044,505 A * | 9/1991 | Spratt | ................... | A47B 57/54 211/22 |
| 5,487,518 A * | 1/1996 | McCraney | ............... | F24H 9/06 248/225.11 |
| 5,740,927 A * | 4/1998 | Yemini | ................ | A47B 96/067 211/66 |
| 5,765,699 A * | 6/1998 | Griffin | .................... | B25H 3/04 211/60.1 |
| 6,050,426 A * | 4/2000 | Leurdijk | ............... | A47B 96/067 211/57.1 |
| 6,131,866 A * | 10/2000 | Kesinger | ............. | A47B 96/067 211/182 |
| 6,152,312 A * | 11/2000 | Nava | .................... | A47B 61/003 211/94.01 |
| 6,220,461 B1 * | 4/2001 | Dickinson | ............ | A47B 57/045 108/108 |
| 6,281,417 B1 * | 8/2001 | Ladao | ................... | A47F 7/0035 211/85.6 |
| 7,699,278 B2 * | 4/2010 | Goldstein | .............. | A47H 1/122 248/220.21 |

(Continued)

*Primary Examiner* — Hiwot E Tefera (57) ABSTRACT

A wall mounted bicycle rack includes a rail with two first grooves along two elongate sides of the rail, and a face opening formed in the front side of the rail, and two end opening formed in two ends of the rail. The rail is slidably connected to multiple fixing members that are fixed to a wall. Each fixing member includes two holders, and the holders are mounted to top and bottom of the rail. Multiple hanging parts each include a slide plate which is slidably engaged with the two first grooves. Each hanging part has a bar for supporting a bicycle.

6 Claims, 13 Drawing Sheets

(56) References Cited

U.S. PATENT DOCUMENTS

| | | | | |
|---|---|---|---|---|
| 9,527,206 | B1* | 12/2016 | Hsieh | B25H 3/04 |
| 2002/0144962 | A1* | 10/2002 | Dettorre | A63C 11/028 |
| | | | | 211/85.7 |
| 2007/0017886 | A1* | 1/2007 | Kao | B25H 3/04 |
| | | | | 211/94.01 |
| 2008/0169395 | A1* | 7/2008 | Bullock | B60P 7/0815 |
| | | | | 248/304 |
| 2011/0240572 | A1* | 10/2011 | Kerman | B62H 3/04 |
| | | | | 211/20 |
| 2016/0095404 | A1* | 4/2016 | Zech | A45C 13/002 |
| | | | | 383/15 |

* cited by examiner

WALL MOUNTED BICYCLE RACK

BACKGROUND OF THE INVENTION

1. Fields of the Invention

The present invention relates to a wall mounted bicycle rack, and more particularly, to a wall mounted bicycle rack with movable hanging parts.

2. Descriptions of Related Art

Figure 11:
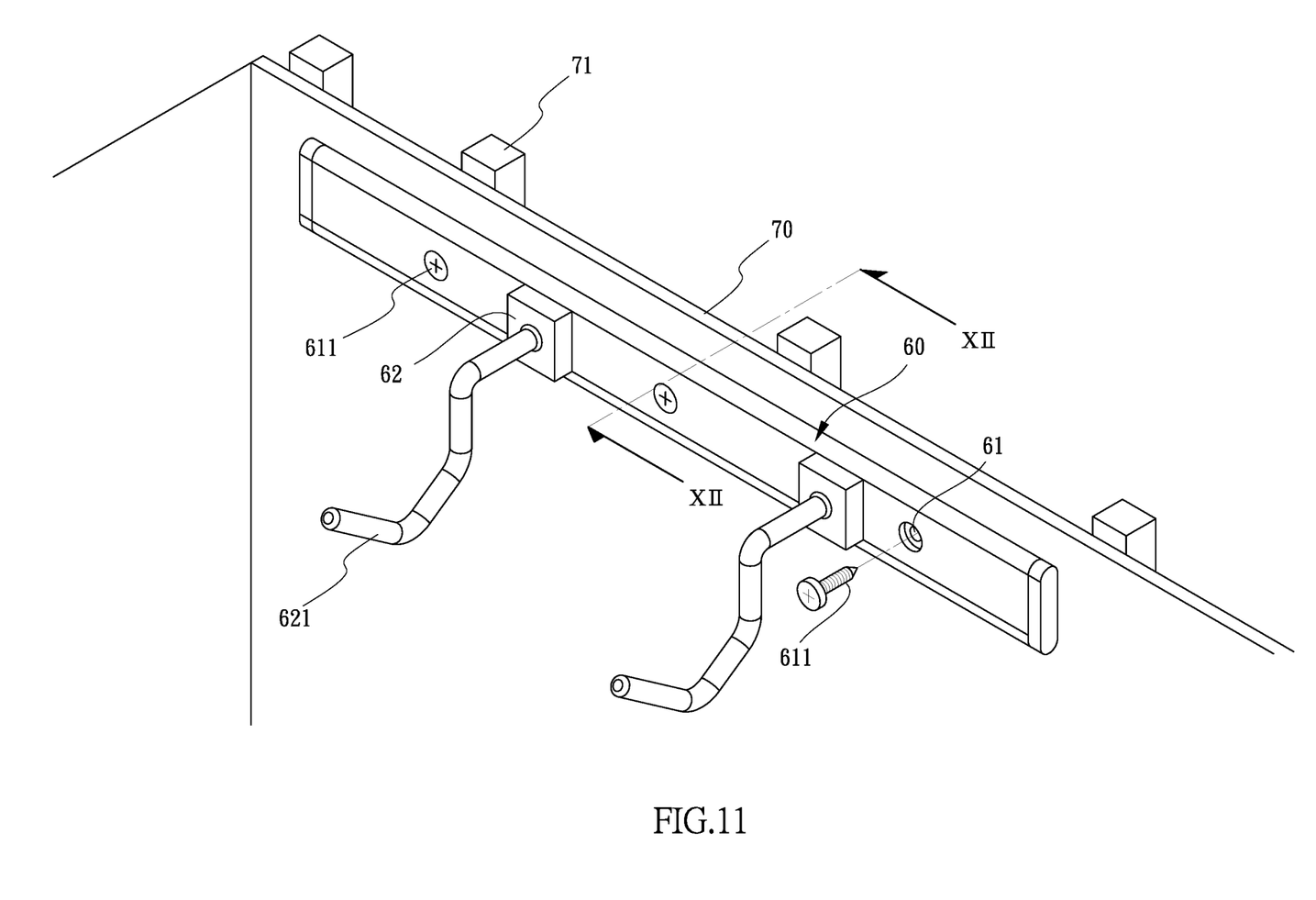
FIG. 11 shows the conventional wall mounted bicycle rack.
Figure 12:
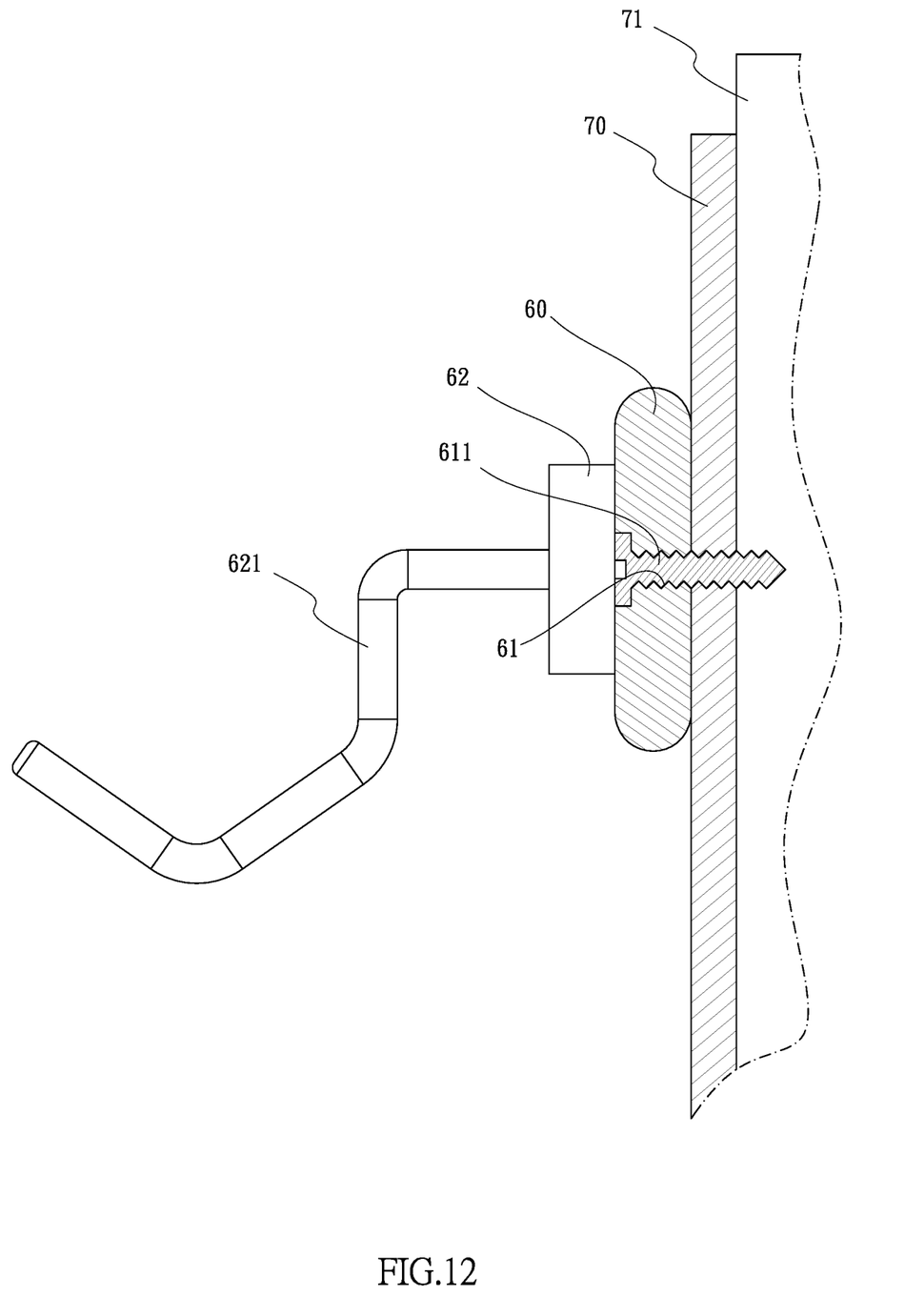
FIG. 12 is an end cross sectional view of the conventional wall mounted bicycle rack.
Figure 13:
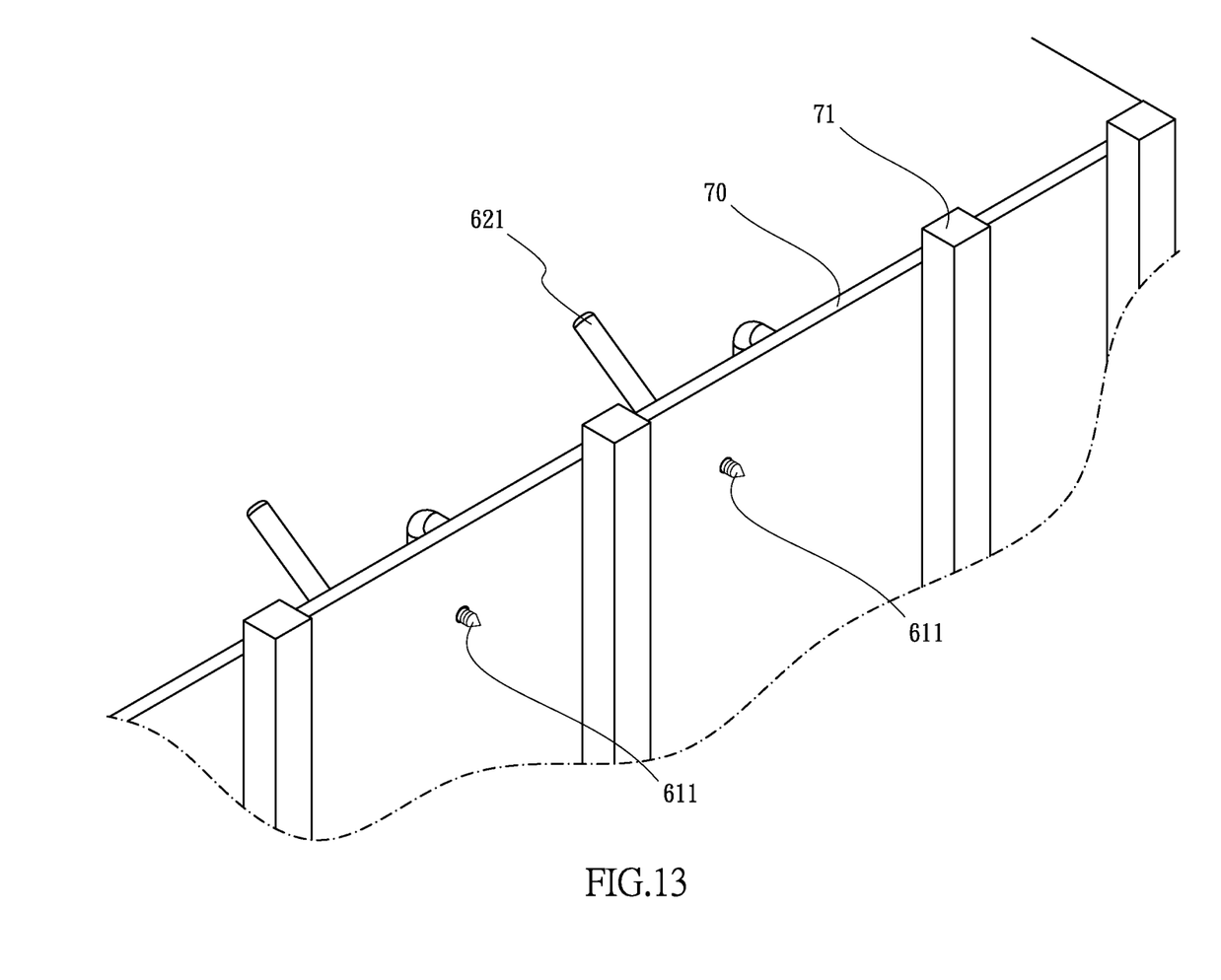
FIG. 13 shows that the bolts that are not connected to the reinforcement columns only extend through the wall.

One of the conventional garage wall mounted bicycle racks known to applicant is disclosed in FIGS. 11 and 12, and the bicycle rack 60 is fixed on the wall 70 by bolts 611 which extend through holes 61 formed through the elongate board of the bicycle rack 60. Specifically, in order to provide strong structure for the weight of the bicycles, there are reinforcement columns 71 connected to the wall 70, because the wall of the garage is thin and is not designed to support heavy load. The bolts 611 extend through the holes 61 of the board of the bicycle rack 60 and the wall 70, and are fixed to the reinforcement columns 71. Multiple blocks 62 are connected to the board of the bicycle rack 60 and each block 62 has a hook 621 extending therefrom. Each hook 621 supports one of the two wheels of a bicycle. It is noted that the board of the bicycle rack cannot be adjusted relative to the corner of the garage. Besides, as shown in FIG. 13, the bolts 611 may not be connected to the reinforcement columns 71 because the positions of the reinforcement columns are not changed, so that the bolts 611 that are not located corresponding to the reinforcement columns 71 can only extend through the wall 70 which usually is a thin wall in the garage. If the load is too heavy, the bolts 611 that are not connected to the reinforcement columns 71 cannot provide sufficient support force to the bicycle rack on the wall 70, and the bicycle rack may be separated from the wall 70.

The present invention intends to provide a wall mounted bicycle rack with movable hanging parts. The rail of the bicycle rack can be adjusted to adjust the space between the bicycle and the corner of the garage.

SUMMARY OF THE INVENTION

The present invention relates to a wall mounted bicycle rack and comprises a rail having two first grooves defined along two elongate sides of the rail. A face opening is formed in the front side of the rail, and two end opening are formed in two ends of the rail. The face opening and the two end opening respectively communicate with the first grooves. Multiple fixing members are fixed to a wall, and each fixing member includes two holders. The holders of each fixing member are mounted to top and bottom of the rail. Multiple hanging parts each include a slide plate which is slidably engaged with the two first grooves of the rail. Each hanging part has a bar that is located at a distance from the slide plate so as to support a bicycle.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 8, the wall mounted bicycle rack of the present invention comprises a rail 10 which is an elongate rail and includes two first grooves 11 defined along two elongate sides of the rail 10. A face opening 111 is formed in the front side of the rail 10, and two end opening 112 are formed in two ends of the rail 10. The face opening 111 and the two end opening 112 respectively communicate with the first grooves 11.

Figure 1:
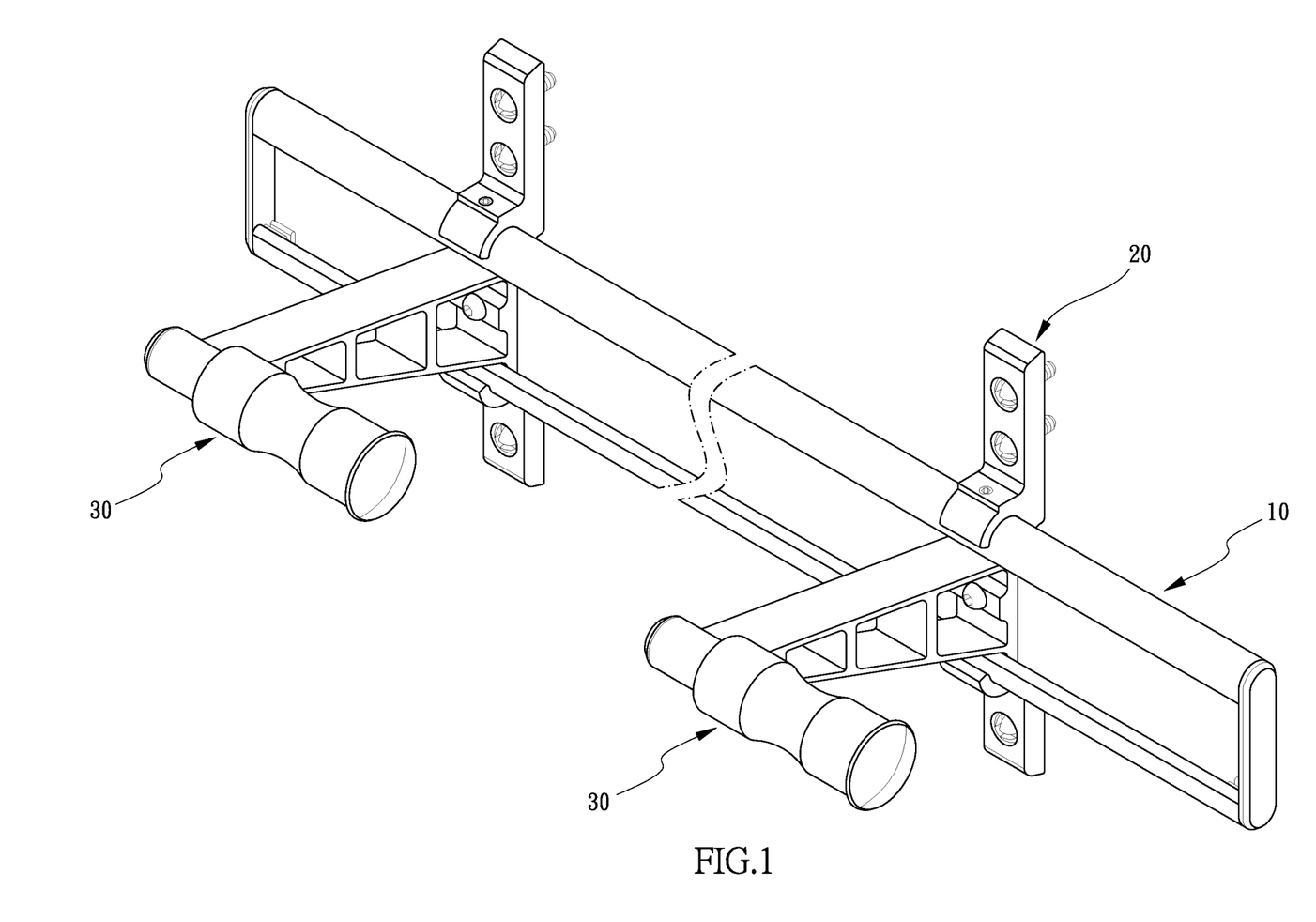
FIG. 1 is a perspective view to show the wall mounted bicycle rack of the present invention.
Figure 2:
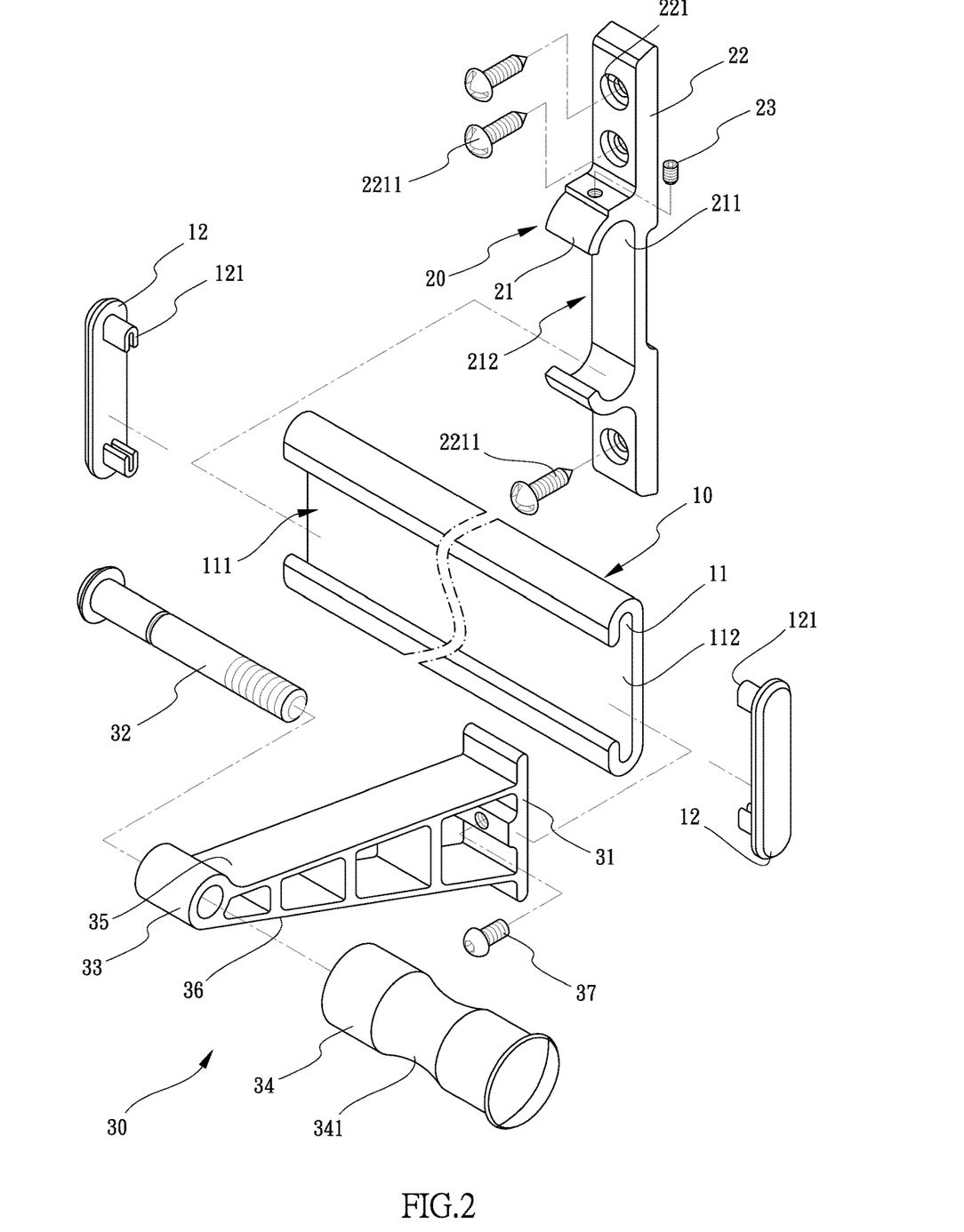
FIG. 2 is an exploded view of the wall mounted bicycle rack of the present invention.
Figure 3:
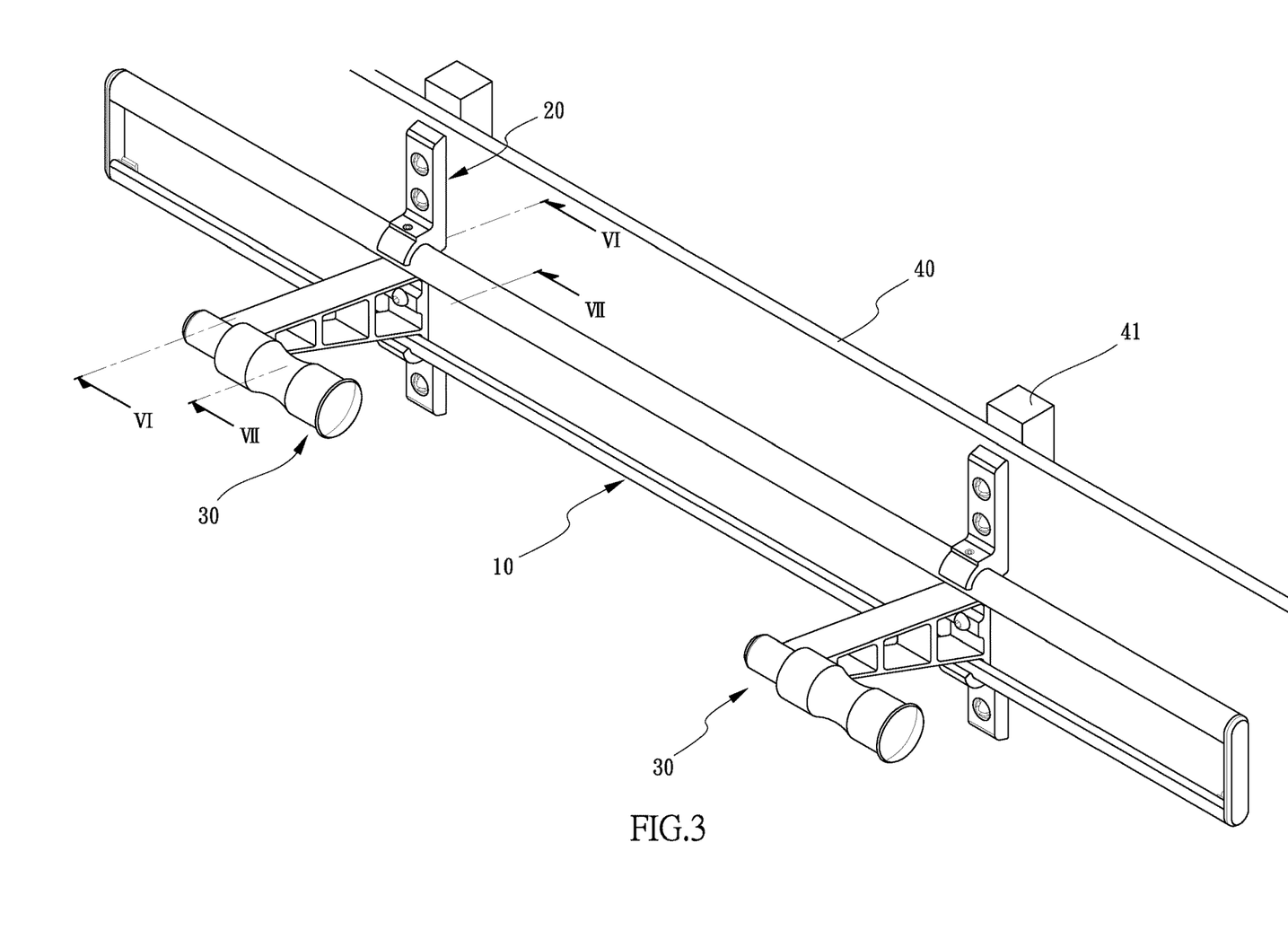
FIG. 3 shows that the wall mounted bicycle rack of the present invention is fixed to a wall.
Figure 6:
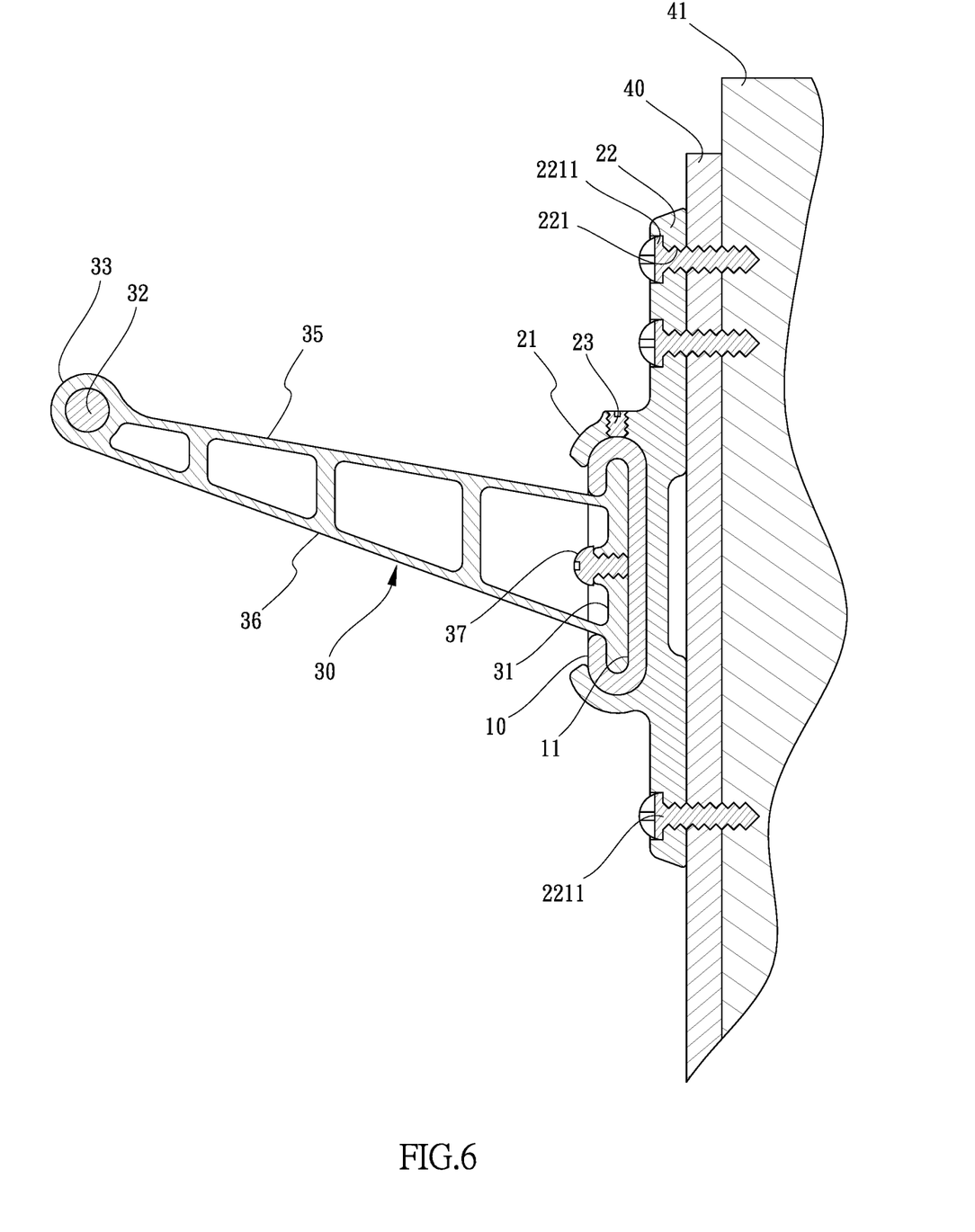
FIG. 6 is a cross sectional view, taken along line VI-VI in FIG. 3.

Multiple fixing members 20 are fixed to a wall 40, preferably, there are reinforcement columns 41 connected to the wall 40, and the fixing members 20 are connected to the reinforcement columns 41 as shown in FIG. 3. Each fixing member 20 includes two holders 21 extending from the front side thereof and each holder 21 is a curved part. Each holder 21 of each fixing member 20 includes a second groove 211 and an entrance 212. The fixing members 20 each include two extensions 22 respectively extending from two ends thereof. Each extension 22 includes multiple threaded holes 221 through which bolts 2211 threadedly extend, and the bolts 2211 extend through the wall 40 and are fixed to the reinforcement columns 41. The holders 21 of each fixing member 20 are mounted to top and bottom of the rail 10. The rail 10 is slidably received in the two second groove 211 and the entrance 212. The face opening 111 and the entrance 212 face the same direction. A first urging member 23 extends through one of the two holders 21 of each fixing member 20 so as to contact against the rail 10 as shown in FIG. 6.

Multiple hanging parts 30 each include a slide plate 31 which is slidably engaged with the two first grooves 11 of the rail 10. A first plate 35 and a second plate 36 extend from the slide plate 31 of each hanging part 30, and a tube 33 is transversely formed to two respective distal ends of the first and second plates 35, 36. In this embodiment, the first plate 35 is not parallel to the second plate 36. The bar 32 extends through the tube 33 and a section of the bar 32 extends beyond the tube 33. A second urging member 37 threadedly extends through a threaded hole defined through the slide plate 31 and contacts against the inside of the rail 10 to position the hanging part 30. The threaded hole is located between the first and second plats 35, 36. A coat 34 made of soft and flexible material is mounted to the section of the bar 32 that extends beyond the tube 33. The coat 34 includes an annular recess 341 formed to an outer periphery thereof.

Figure 4:
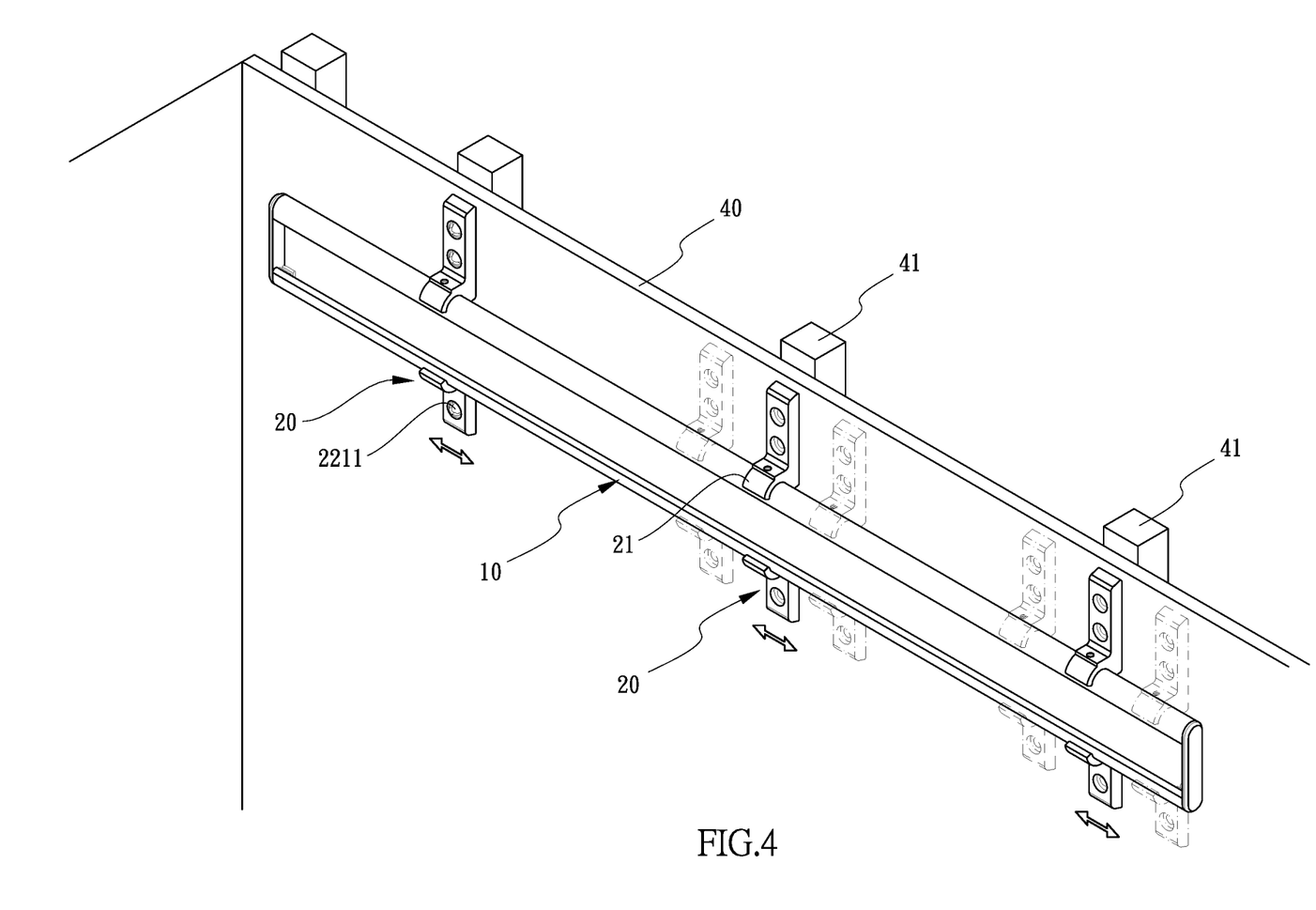
FIG. 4 shows that the fixing members are slidable relative to the rail of the wall mounted bicycle rack of the present invention before being fixed.
Figure 5:
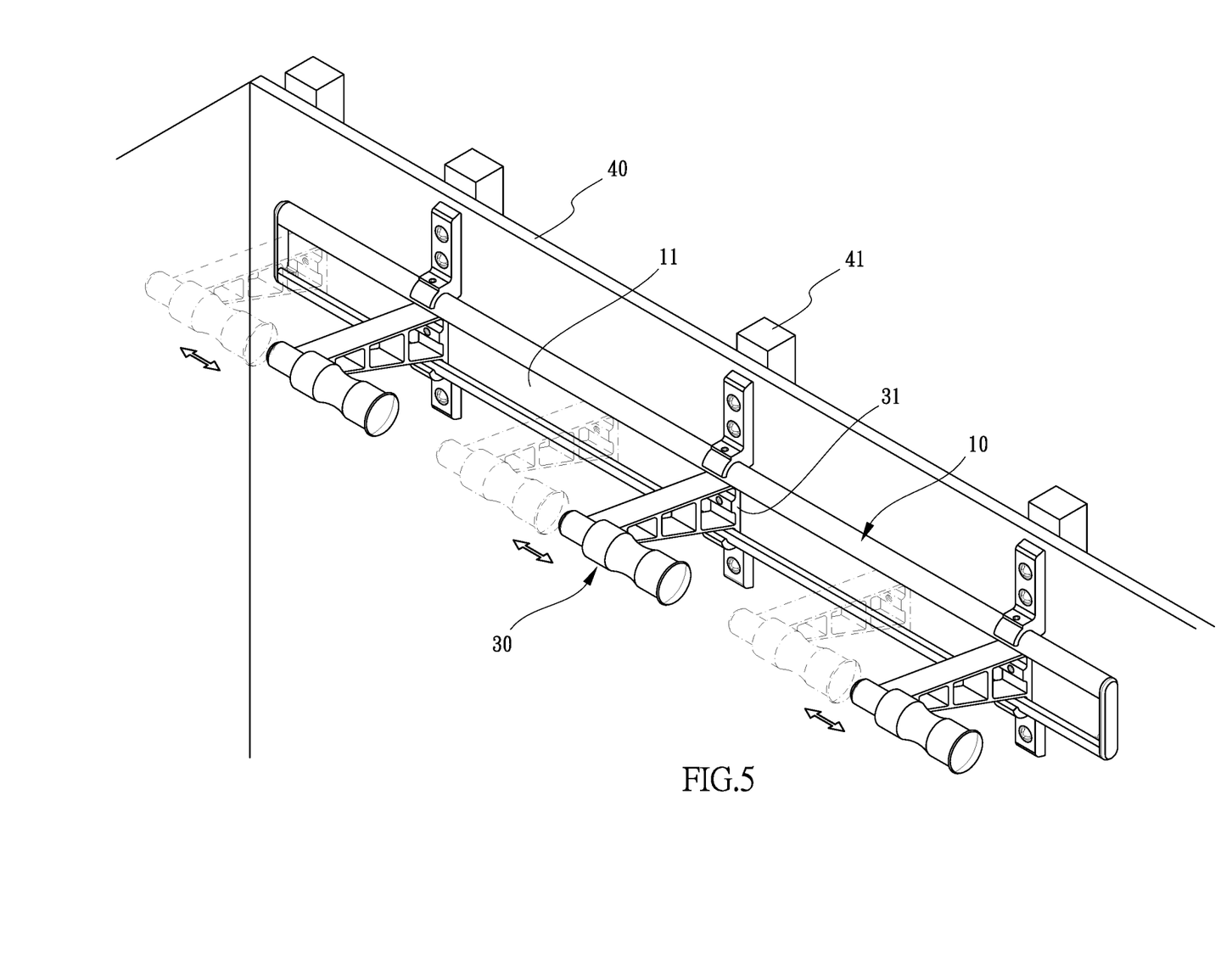
FIG. 5 shows that the hanging parts are slidable relative to the rail of the wall mounted bicycle rack of the present invention before being secured.
Figure 7:
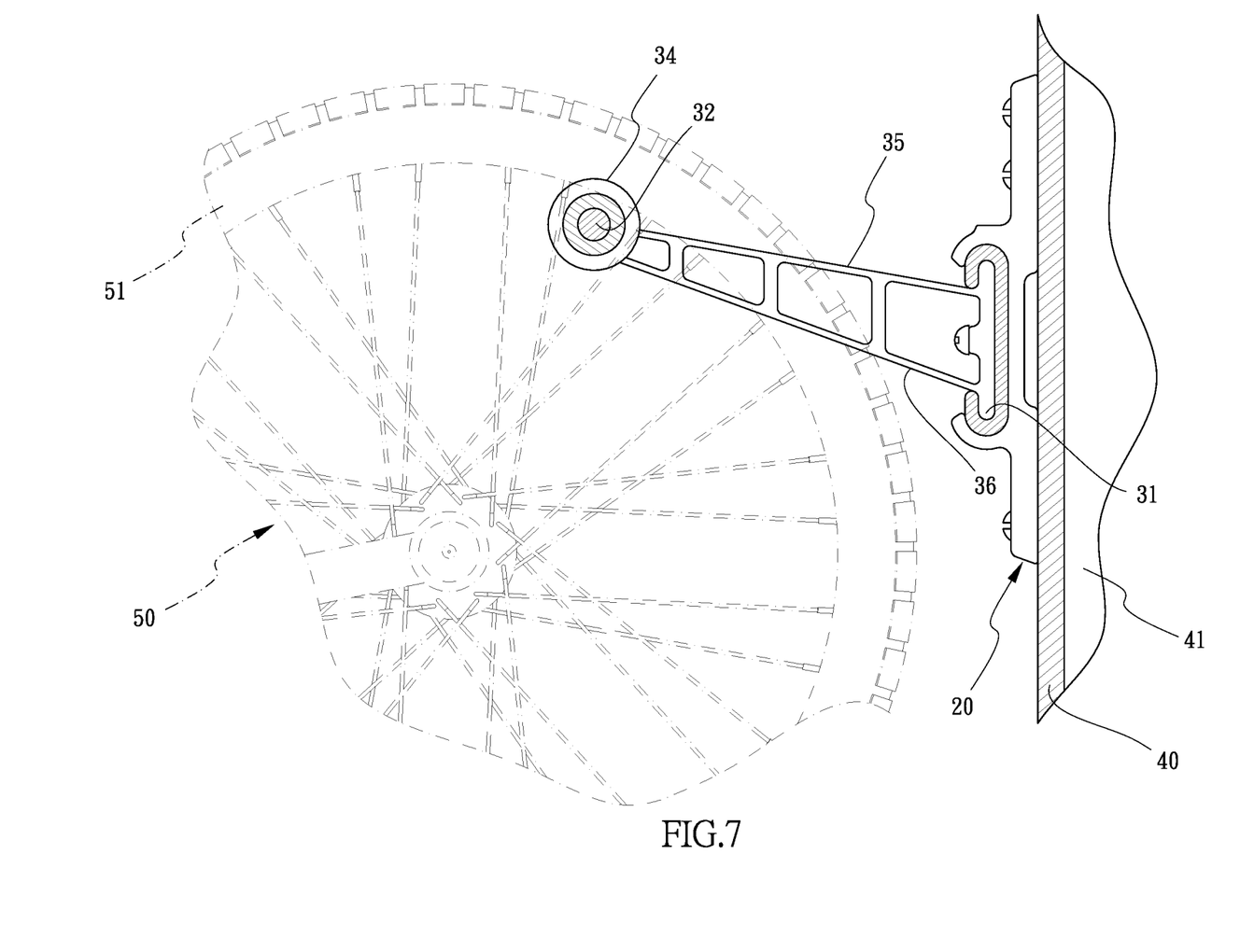
FIG. 7 is a cross sectional view, taken along line VII-VII in FIG. 3, and a bicycle wheel is hanging on the bar of the hanging part of the wall mounted bicycle rack of the present invention.
Figure 9:
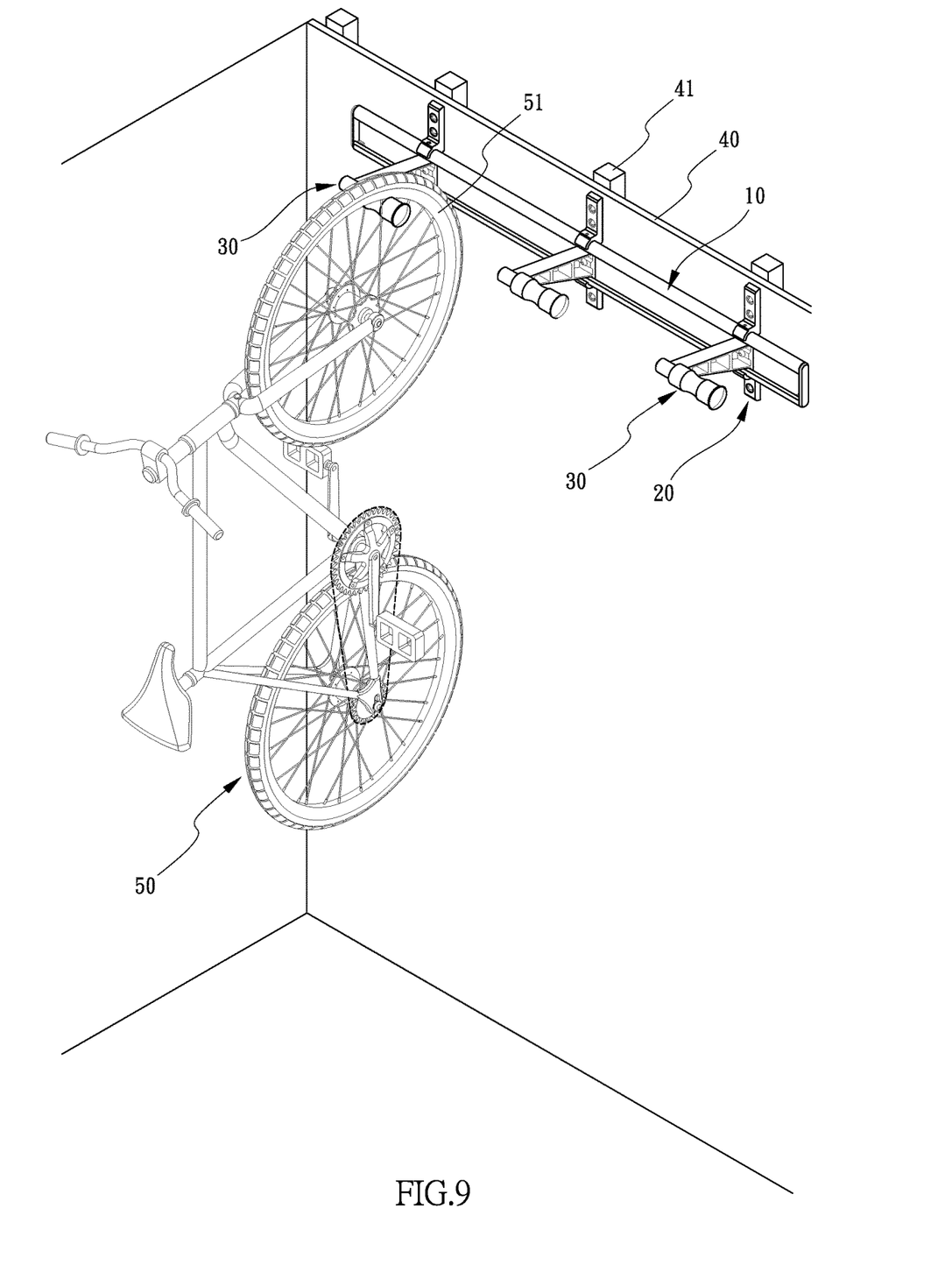
FIG. 9 is a perspective view to show that a bicycle wheel is hanging on the bar of the hanging part of the wall mounted bicycle rack of the present invention.

As shown in FIG. 4, the positions that the fixing members 20 are located can be adjusted by sliding along the rail 10 before being fixed so as to easily install to the wall 40 of any garage. As shown in FIG. 5, the hanging parts 30 can be adjusted along the rail 10 to control the distance between the corner wall of the garbage and the closest hanging part 30. The bicycle wheel rim 51 is hanging on the bar 32 as shown in FIGS. 7 and 9.

Figure 8:
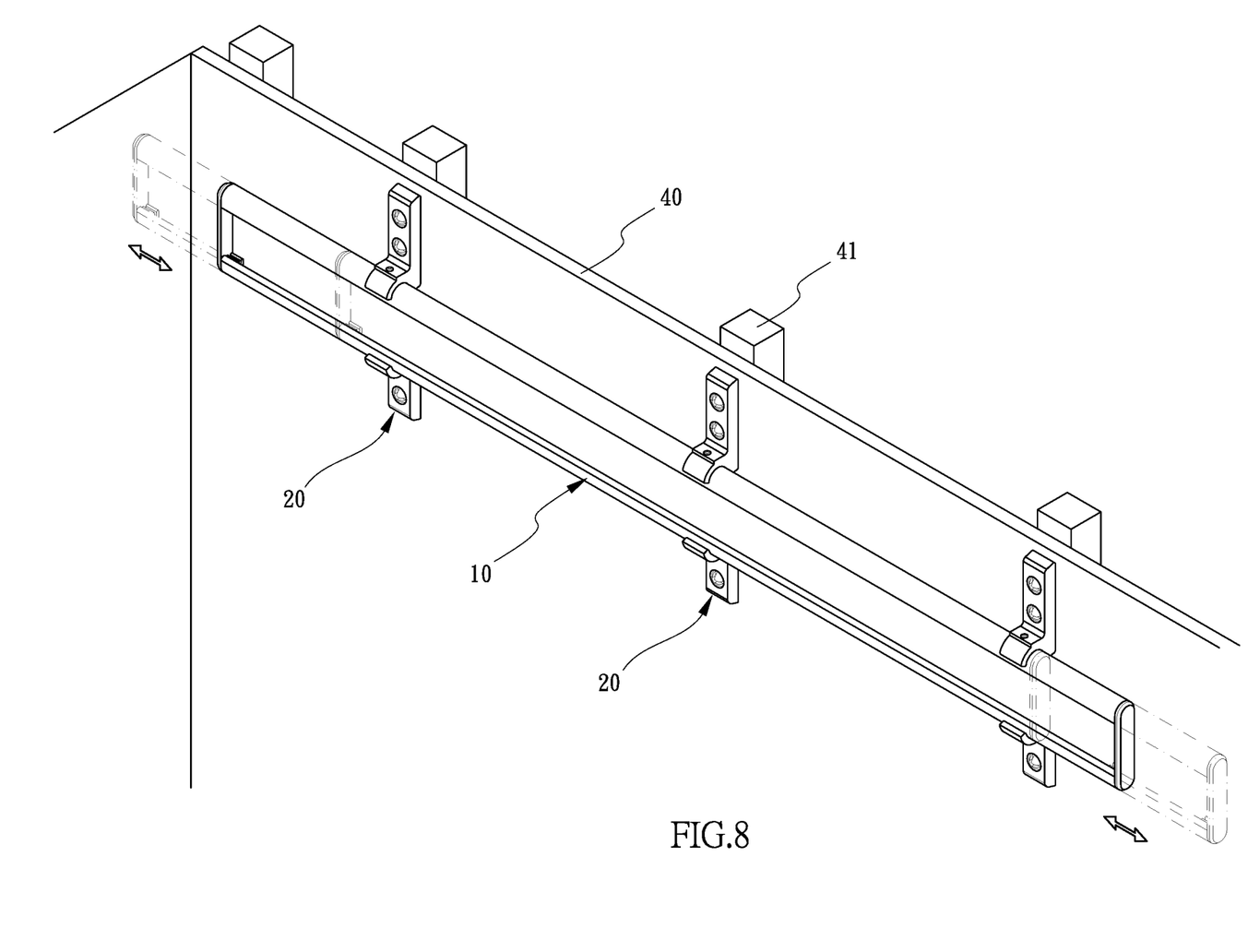
FIG. 8 shows that the rail is slidable relative to the fixing members.
Figure 10:
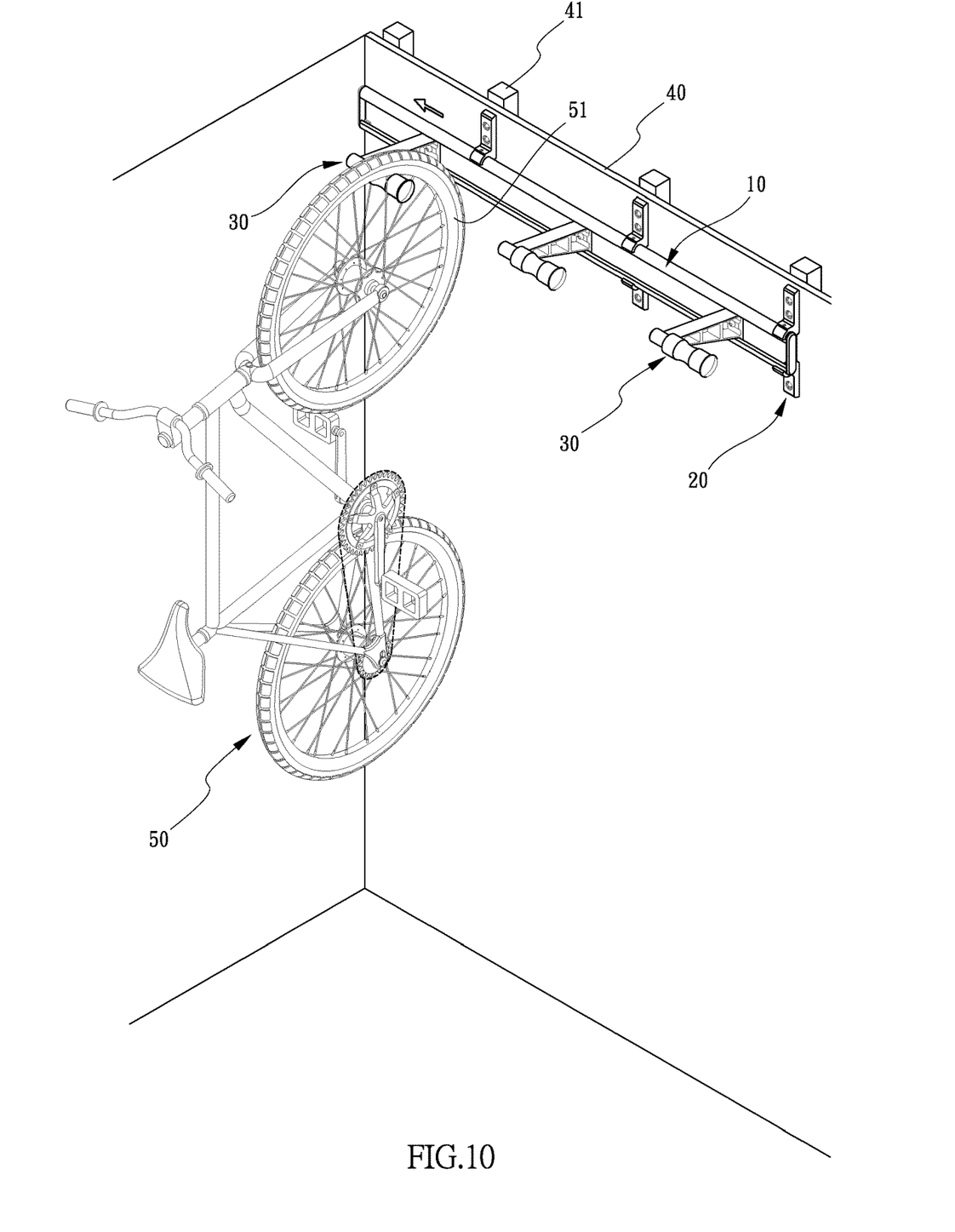
FIG. 10 shows that the rail is slid toward the corner of the garage.

As shown in FIGS. 8 and 10, the rail 10 can be adjusted to move toward the corner wall of the garage so that the bicycle 50 can be position close to the corner wall to save space.

In this embodiment, two caps 12 are respectively mounted to the two end openings 112 of the rail 10. Each cap 12 has two protrusions 121 extending from an inside thereof.

While we have shown and described the embodiment in accordance with the present invention, it should be clear to those skilled in the art that further embodiments may be made without departing from the scope of the present invention.

What is claimed is:

1. A wall mounted bicycle rack comprising:
   a rail having two first grooves defined along two elongate sides of the rail, a face opening formed in a front side of the rail, two end opening formed in two ends of the rail, the face opening and the two end opening respectively communicating with the first grooves;
   multiple fixing members adapted to be fixed to a wall, each fixing member including two holders, the holders of each fixing member mounted to top and bottom of the rail, and
   multiple hanging parts each including a slide plate which is slidably engaged with the two first grooves of the rail, each hanging part having a bar that is located at a distance from the slide plate so as to support a bicycle, each of the hanging parts including a tube, the bar extending through the tube, a section of the bar extending beyond the tube, a coat mounted to the section of the bar that extends beyond the tube, a first plate and a second plate extending from the slide plate, the tube transversely formed to two respective distal ends of the first and second plates, the first plate being not parallel to the second plate.

2. The wall mounted bicycle rack as claimed in claim 1, wherein the fixing members each include two extensions respectively extending from two ends thereof, each extension includes multiple threaded holes through which bolts threadedly extend, each holder of each fixing member includes a second groove and an entrance, the rail is slidably received in the two second groove and the entrance, the face opening and the entrance face a common same direction.

3. The wall mounted bicycle rack as claimed in claim 1 further comprising two caps respectively mounted to the two end openings of the rail, each cap has at least one protrusion extending from an inside thereof.

4. The wall mounted bicycle rack as claimed in claim 1, wherein a first urging member extends through one of the two holders of each fixing member so as to contact against the rail.

5. The wall mounted bicycle rack as claimed in claim further comprising a second urging member which threadedly extends through a threaded hole defined through the slide plate and contacts against an inside of the rail, the threaded hole is located between the first and second plates.

6. The wall mounted bicycle rack as claimed in claim 1, wherein the coat includes an annular recess formed to an outer periphery thereof.

* * * * *